(12) United States Patent
Reve

(10) Patent No.: US 9,709,798 B2
(45) Date of Patent: Jul. 18, 2017

(54) PORTABLE MAGNIFYING ASSEMBLY

(71) Applicant: Hiram Reve, Green Brook, NJ (US)

(72) Inventor: Hiram Reve, Green Brook, NJ (US)

( * ) Notice: Subject to any disclaimer, the term of this patent is extended or adjusted under 35 U.S.C. 154(b) by 63 days.

(21) Appl. No.: 14/676,940

(22) Filed: Apr. 2, 2015

(65) Prior Publication Data

US 2016/0291314 A1  Oct. 6, 2016

(51) Int. Cl.
*G02B 25/00* (2006.01)
*G02B 7/22* (2006.01)
*G02B 7/20* (2006.01)

(52) U.S. Cl.
CPC ............. *G02B 25/005* (2013.01); *G02B 7/20* (2013.01); *G02B 7/22* (2013.01); *G02B 25/00* (2013.01); *G02B 25/002* (2013.01); *G02B 25/007* (2013.01)

(58) Field of Classification Search
CPC .... G02B 25/00; G02B 25/002; G02B 25/005; G02B 25/007; G02B 7/20; G02B 7/22; H04M 1/027
USPC ............. 359/798, 801, 802, 804; 345/30, 32
See application file for complete search history.

(56) References Cited

U.S. PATENT DOCUMENTS

| | | | | |
|---|---|---|---|---|
| 2,294,992 A * | 9/1942 | Landrock | ............... | G03B 27/46 355/54 |
| 2,506,347 A * | 5/1950 | Davis | ..................... | G03B 27/38 355/58 |
| 2,537,373 A * | 1/1951 | Rosenberg | ........... | G02B 27/023 378/190 |
| 4,030,814 A | 6/1977 | Clifton et al. | | |
| 4,272,172 A * | 6/1981 | Guillaume | ............. | G03B 17/12 355/32 |
| 4,337,996 A * | 7/1982 | Kuramoto | ............... | G03B 17/04 359/823 |
| 4,949,126 A * | 8/1990 | Frelier | ................. | G03G 15/041 396/342 |
| 4,962,398 A * | 10/1990 | Sorg | ..................... | G03B 17/045 396/33 |
| D328,909 S | 8/1992 | Sakurai | | |
| D401,479 S | 11/1998 | Norman et al. | | |
| 5,878,295 A * | 3/1999 | Katagiri | ............... | G03B 17/045 396/341 |
| 7,529,042 B2 | 5/2009 | Lossee | | |
| 7,792,550 B2 | 9/2010 | Lishan | | |
| 8,520,370 B2 | 8/2013 | Waitzman, III et al. | | |
| 9,405,126 B1 * | 8/2016 | Margolin | ........... | H04N 5/23293 |
| 2009/0257136 A1 | 10/2009 | Liu | | |
| 2010/0031545 A1* | 2/2010 | Waterhouse | ............... | G09F 1/14 40/606.03 |
| 2012/0081808 A1* | 4/2012 | Nagai | ................ | B23K 26/0869 359/871 |
| 2012/0243110 A1* | 9/2012 | Robinson | ............. | G02B 25/002 359/742 |

(Continued)

Primary Examiner — William R Alexander

(57) ABSTRACT

A portable magnifying assembly includes an external electronic device that may display an image. A bellows has a top end, a bottom end and a peripheral wall extending therebetween. The top end is open and the bellows are substantially hollow. The bottom end may be positioned on a support surface and the bellows may be positioned in an extended position. A magnifying plate is removably positioned on the bellows thereby facilitating the magnifying plate to magnify the image displayed on the external electronic device when the bellows is positioned in the extended position.

5 Claims, 3 Drawing Sheets

(56) References Cited

U.S. PATENT DOCUMENTS

2013/0208191 A1 8/2013 Signore
2015/0338635 A1* 11/2015 Gantz .................. G02B 25/002
                                                      345/32

* cited by examiner

PORTABLE MAGNIFYING ASSEMBLY

BACKGROUND OF THE DISCLOSURE

Field of the Disclosure

The disclosure relates to magnifying devices and more particularly pertains to a new magnifying device for magnifying an image displayed on an external electronic device.

SUMMARY OF THE DISCLOSURE

An embodiment of the disclosure meets the needs presented above by generally comprising an external electronic device that may display an image. A bellows has a top end, a bottom end and a peripheral wall extending therebetween. The top end is open and the bellows are substantially hollow. The bottom end may be positioned on a support surface and the bellows may be positioned in an extended position. A magnifying plate is removably positioned on the bellows thereby facilitating the magnifying plate to magnify the image displayed on the external electronic device when the bellows is positioned in the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
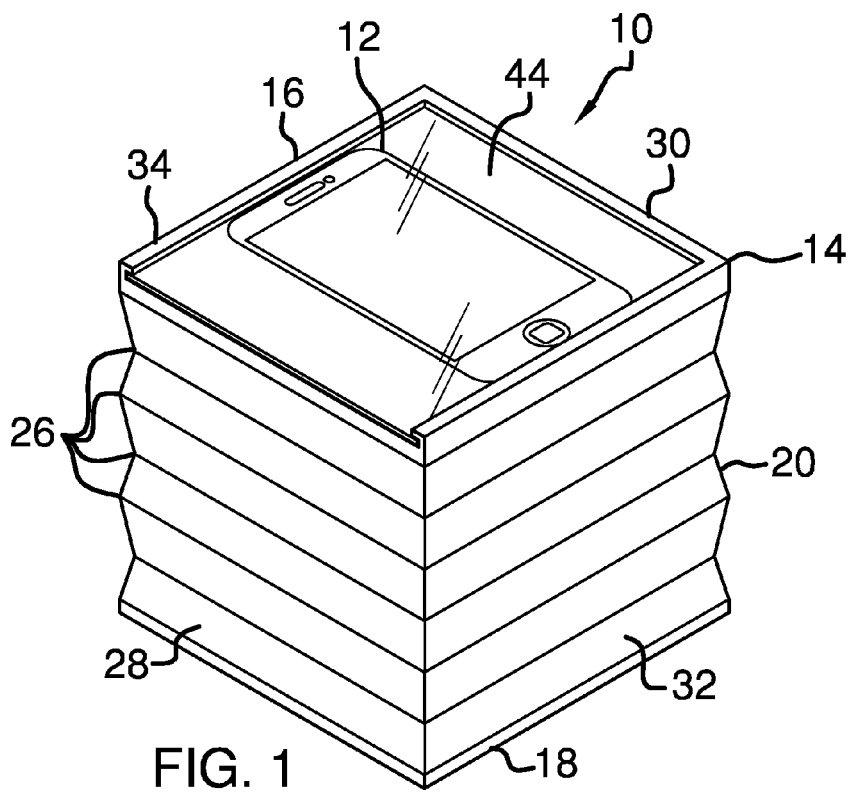
FIG. 1 is a top perspective view of a portable magnifying assembly according to an embodiment of the disclosure.
Figure 2:
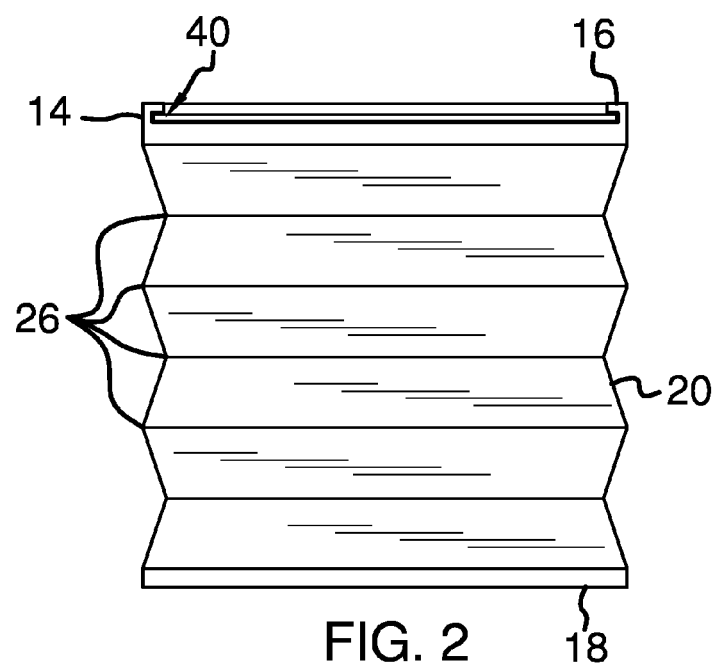
FIG. 2 is a front view of an embodiment of the disclosure.
Figure 3:
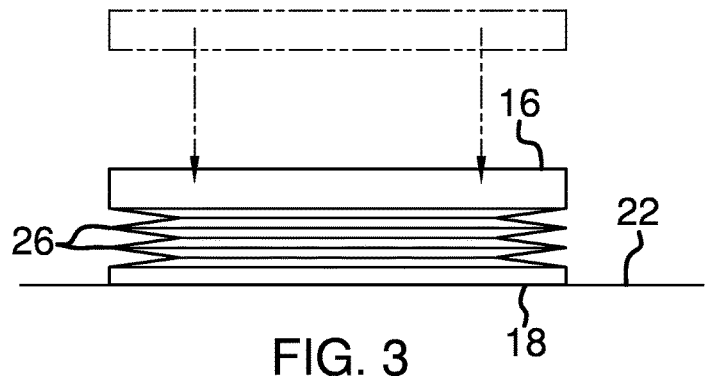
FIG. 3 is a back view of an embodiment of the disclosure in a collapsed position.
Figure 4:
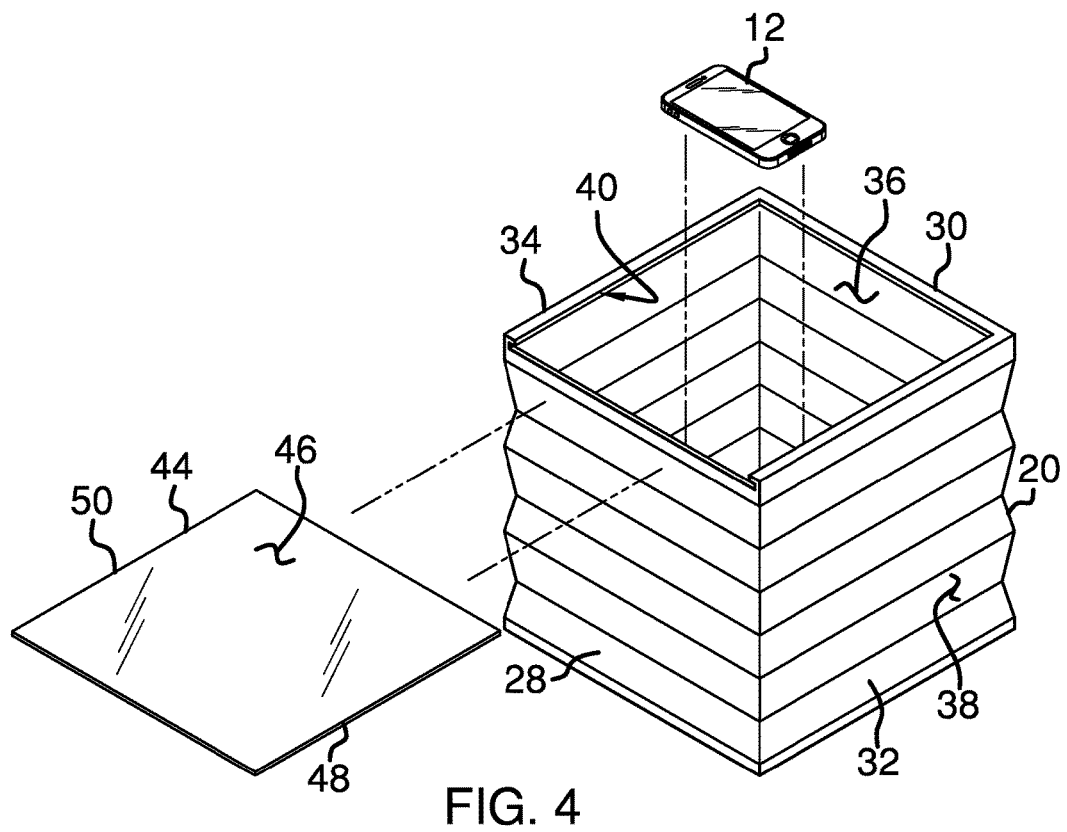
FIG. 4 is a front perspective view of an embodiment of the disclosure.
Figure 5:
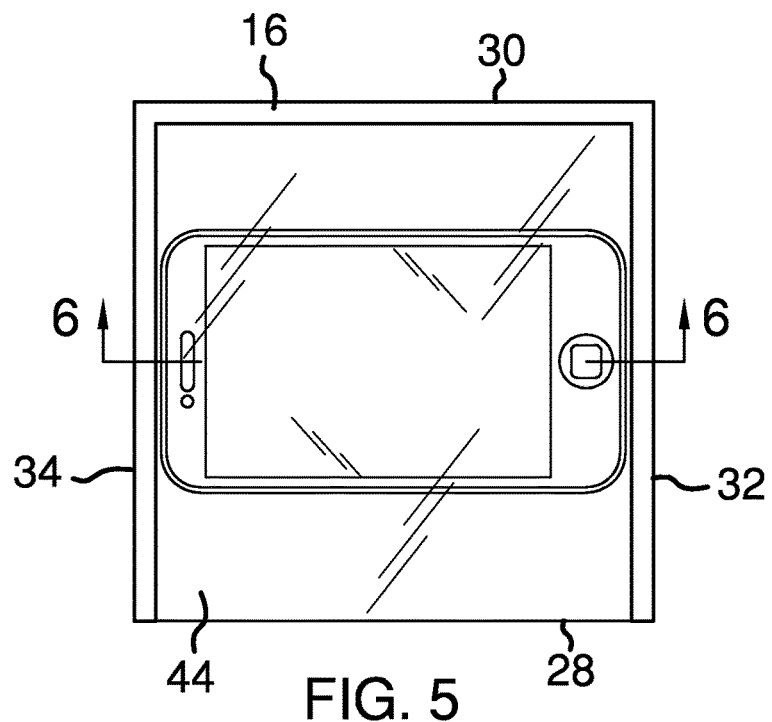
FIG. 5 is a top view of an embodiment of the disclosure.
Figure 6:
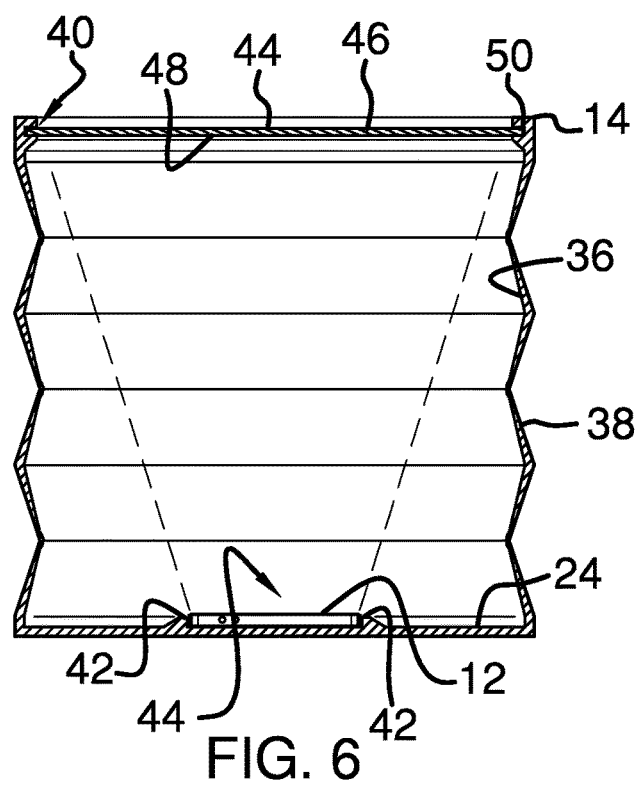
FIG. 6 is a cross sectional view taken along line 6-6 of FIG. 5 of an embodiment of the disclosure.

With reference now to the drawings, and in particular to FIGS. 1 through 6 thereof, a new magnifying device embodying the principles and concepts of an embodiment of the disclosure and generally designated by the reference numeral 10 will be described.

As best illustrated in FIGS. 1 through 6, the portable magnifying assembly 10 generally comprises an external electronic device 12 that may display an image. The electronic device 12 may be a smartphone or the like and the image may be a static image or a video. A bellows 14 is provided that has a top end 16, a bottom end 18 and a peripheral wall 20 extending therebetween. The top end 16 is open and the bellows 14 is substantially hollow. The bottom end 18 may be positioned on a support surface 22 and the bottom end 18 has a top surface 24. The support surface 22 may be a table top or the like.

The peripheral wall 20 comprises a plurality of pleats 26 that are spaced apart from each other and distributed between the top end 16 and the bottom end 18. The bellows 14 are positioned in a collapsed position having the pleats 26 being compressed against each other such that the top end 16 is positioned proximate the bottom end 18. Additionally, the bellows 14 are positioned in an extended position having the pleats 26 being expanded such that the top end 16 is spaced from the bottom end 18. The bellows 14 has a height between approximately 10 inches and 12 inches when the bellows 14 is positioned in the extended position.

The peripheral wall 20 has a front side 28, a back side 30, a first lateral side 32 and a second lateral side 34. The peripheral wall 20 has an inside surface 36 and an outside surface 38 and the inside surface 36 has a groove 40 extending toward the outside surface 38. The groove 40 extends along each of the front side 28, the first lateral side 32, the back side 30 and the second lateral side 34. Moreover, the groove 40 extends completely through the inside surface 36 and the outside surface 38 corresponding to the front side 28 and the groove 40 is positioned closer to the top end 16 than the bottom end 18. The top surface 24 of the bottom end 18 has a pair of ridges 42 extending upwardly therefrom and each of the ridges 42 is spaced apart from a center 44 of the top surface 24. The external electronic device 12 is positioned between the ridges 42 such that the external electronic device 12 is retained on the top surface 24.

A magnifying plate 44 is provided that has an upper surface 46, a lower surface 48 and a perimeter edge 50 extending therebetween. The upper surface 46 is arcuate with respect to the lower surface 48 such that the magnifying plate 44 has a focal point that is positioned between approximately 10 inches and 12 inches from the lower surface 48. The magnifying plate 44 is slid into the groove 40 on the front side 28 of the bellows 14 such that the magnifying plate 44 closes the top end 16 and the lower surface 48 faces the top surface 24 of the bottom end 18. The focal point of the magnifying plate 44 is positioned approximately at the top surface 24 of the bottom end 18 to facilitate the magnifying plate 44 to magnify the image displayed on the external electronic device 12 when the bellows 14 is positioned in the extended position.

In use, the bellows 14 are placed on the support surface 22 and the bellows 14 are positioned in the extended position. The external electronic device 12 is positioned between the ridges 42 and the external electronic device 12 is actuated to display the image. The magnifying plate 44 is slid into the groove 40 so the lower surface 48 of the magnifying plate 44 faces the bottom end 18 of the bellows 14. The magnifying plate 44 magnifies the image to facilitate the image being viewed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable magnifying assembly configured to magnify an image displayed by an electronic device, said assembly comprising:

an external electronic device being configured to display an image;

a bellows having a top end, a bottom end and a peripheral wall extending therebetween, said top end being vertically aligned with said bottom end wherein said peripheral wall extends substantially perpendicularly between said top end and said bottom end, said top end being open, said bottom end being an integral extension of said peripheral wall, said bellows being substantially hollow, said bottom end being configured to be positioned on a support surface, said bellows being positioned in an extended position; and a magnifying plate removably positioned on said bellows such that said magnifying plate is configured to magnify the image displayed on said external electronic device when said bellows is positioned in said extended position;

wherein said bottom end has a top surface, said peripheral wall comprising a plurality of pleats being spaced apart from each other and distributed between said top end and said bottom end, said bellows being positioned in a collapsed position having said pleats being compressed against each other such that said top end is positioned proximate said bottom end, said bellows being positioned in an extended position having said pleats being expanded such that said top end is spaced from said bottom end, said bellows having a height being between approximately 10 inches and 12 inches when said bellows is positioned in said extended position; and wherein said top surface has a pair of ridges extending upwardly therefrom, said external electronic device being positionable between said ridges such that said external electronic device is retained on said top surface, each of said ridges being spaced apart from a center of said top surface and inset from said peripheral wall such that said ridges center said external electronic device on said top surface.

2. The assembly according to claim 1, wherein said peripheral wall has a front side, a back side, a first lateral side and a second lateral side, said peripheral wall having an inside surface and an outside surface, said inside surface having a groove extending toward said outside surface, said groove extending along each of said front side, said first lateral side, said back side and said second lateral side, said groove extending completely through said inside surface and said outside surface corresponding to said front side, said groove being positioned closer to said top end than said bottom end.

3. The assembly according to claim 1, wherein said magnifying plate has an upper surface, a lower surface and a perimeter edge extending therebetween, said upper surface being arcuate with respect to said lower surface such that said magnifying plate has a focal point being positioned between approximately 10 inches and 12 inches from said lower surface.

4. The assembly according to claim 3, wherein:

said bellows has a front side, said front side having a groove, said bottom end having a top surface; and said magnifying plate is slid into said groove on said front side of said bellows such that said magnifying plate closes said top end, said lower surface facing said bottom end when said magnifying plate is positioned within said groove, said focal point being positioned approximately on said top surface of said bottom end.

5. A portable magnifying assembly configured to magnify an image displayed by an electronic device, said assembly comprising:

an external electronic device being configured to display an image;

a bellows having a top end, a bottom end and a peripheral wall extending therebetween, said top end being vertically aligned with said bottom end wherein said peripheral wall extends substantially perpendicularly between said top end and said bottom end, said top end being open, said bottom end being an integral extension of said peripheral wall, said bellows being substantially hollow, said bottom end being configured to be positioned on a support surface, said bottom end having a top surface, said peripheral wall comprising a plurality of pleats being spaced apart from each other and distributed between said top end and said bottom end, said bellows being positioned in a collapsed position having said pleats being compressed against each other such that said top end is positioned proximate said bottom end, said bellows being positioned in an extended position having said pleats being expanded such that said top end is spaced from said bottom end, said bellows having a height being between approximately 10 inches and 12 inches when said bellows is positioned in said extended position, said peripheral wall having a front side, a back side, a first lateral side and a second lateral side, said peripheral wall having an inside surface and an outside surface, said inside surface having a groove extending toward said outside surface, said groove extending along each of said front side, said first lateral side, said back side and said second lateral side, said groove extending completely through said inside surface and said outside surface corresponding to said front side, said groove being positioned closer to said top end than said bottom end, said top surface having a pair of ridges extending upwardly therefrom, said external electronic device being positionable between said ridges such that said external electronic device is retained on said top surface, each of said ridges being spaced apart from a center of said top surface and inset from said peripheral wall such that said ridges center said external electronic device on said top surface; and a magnifying plate having an upper surface, a lower surface and a perimeter edge extending therebetween, said upper surface being arcuate with respect to said lower surface such that said magnifying plate has a focal point being positioned between approximately 10 inches and 12 inches from said lower surface, said magnifying plate being slid into said groove on said front side of said bellows such that said magnifying plate closes said top end, said lower surface facing said bottom end when said magnifying plate is positioned within said groove, said focal point being positioned approximately on said top surface of said bottom end such that said magnifying plate is configured to magnify the image displayed on said external electronic device when said bellows is positioned in said extended position.

\* \* \* \* \*